United States Patent
Frederick et al.

(10) Patent No.: US 10,769,094 B2
(45) Date of Patent: Sep. 8, 2020

(54) CONFIGURATION OPTIONS FOR DISPLAY DEVICES

(71) Applicant: HEWLETT-PACKARD DEVELOPMENT COMPANY, L.P., Spring, TX (US)

(72) Inventors: John W. Frederick, Spring, TX (US); Tim Guynes, Spring, TX (US); Wen-Shih Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/483,007

(22) PCT Filed: Feb. 1, 2017

(86) PCT No.: PCT/US2017/015979
§ 371 (c)(1),
(2) Date: Aug. 1, 2019

(87) PCT Pub. No.: WO2018/143975
PCT Pub. Date: Aug. 9, 2018

(65) Prior Publication Data
US 2020/0012613 A1    Jan. 9, 2020

(51) Int. Cl.
*G06F 13/42* (2006.01)
(52) U.S. Cl.
CPC .. *G06F 13/4282* (2013.01); *G06F 2213/0042* (2013.01)
(58) Field of Classification Search
CPC .................. G06F 13/4282; G06F 2213/0042
See application file for complete search history.

(56) References Cited

U.S. PATENT DOCUMENTS 8,615,611 B2 *  12/2013  Hall ..................... G06F 13/385
                                                710/66
9,208,118 B2    12/2015  Lee et al.
(Continued)

FOREIGN PATENT DOCUMENTS

CA         2793617         10/2011
KR      20080040926          5/2008
WO     WO-2014072826         5/2014

OTHER PUBLICATIONS

Smith, R, Displayport Alternate Mode for USB Type-c Announced—Video, Power, 8 Data All Over Type-c, Sep. 22, 2014, <http://www.anandtech.com/show/8556/displayport-alternate-mode-for-usb-typec-announced >.

*Primary Examiner* — Henry Tsai
*Assistant Examiner* — Christopher Daley
(74) *Attorney, Agent, or Firm* — Tong Rea Bentley & Kim

(57) ABSTRACT

In example implementations, a method to change a data transfer configuration of a data cable is provided. The method includes receiving a selection of a data transfer configuration option from a plurality of different data transfer configuration options of a data cable that has data lanes to transfer video data and non-video data. A reported number of supported resolutions or refresh rates is modified in accordance with the data transfer configuration option that is selected. The reported number of supported resolutions or refresh rates that is modified is then transmitted to a computing device connected to a display device via the data cable to transmit data via the data cable in accordance with the data transfer configuration option that is selected.

15 Claims, 5 Drawing Sheets

(56) References Cited

U.S. PATENT DOCUMENTS

| | | | |
|---|---|---|---|
| 9,411,762 B2* | 8/2016 | Natu | G06F 12/06 |
| 9,772,965 B2* | 9/2017 | Parten | G06F 13/385 |
| 9,953,613 B2* | 4/2018 | Sacchetto | G09G 5/006 |
| 10,031,873 B2* | 7/2018 | Hundal | G06F 13/385 |
| 10,169,286 B2* | 1/2019 | Hundal | G06F 13/4282 |
| 10,331,579 B2* | 6/2019 | Gupta | G06F 13/102 |
| 2008/0008172 A1 | 1/2008 | Kobayashi | |
| 2010/0082846 A1 | 4/2010 | Kim et al. | |
| 2011/0055407 A1 | 3/2011 | Lydon et al. | |
| 2012/0079140 A1* | 3/2012 | Bar-Niv | G06F 3/14 |
| | | | 710/16 |
| 2014/0105230 A1 | 4/2014 | Kabiry et al. | |
| 2014/0297898 A1 | 10/2014 | Parten et al. | |
| 2015/0215343 A1* | 7/2015 | Itkin | H04L 41/04 |
| | | | 709/217 |
| 2016/0345022 A1* | 11/2016 | Ju | H04N 19/00 |
| 2019/0057636 A1* | 2/2019 | Tsai | G06T 11/206 |

* cited by examiner

CONFIGURATION OPTIONS FOR DISPLAY DEVICES

BACKGROUND

Universal serial bus (USB) cabling is used to provide electrical connections. USB connectors have evolved from USB 1.0 to 3.0+ designs. USB connectors can provide data transfer at relatively high speeds and provide power to electronic devices.

A relatively new type of USB connector is a USB type C (USB-C) cable. USB-C is associated with a USB specification that contains a fully reversible-plug connector for USB compatible devices and cabling. A USB-C cable comprises four twisted pairs or lanes for data transfer and additional connector pins assigned for USB 2.0 support.

DETAILED DESCRIPTION

The present disclosure discloses methods and devices for changing a configuration of a data cable for a display device. As discussed above, a relatively new type of USB connector is a USB type C (USB-C) cable. USB-C is associated with a USB specification that contains a fully reversible-plug connector for USB compatible devices and cabling. A USB-C cable comprises four twisted pairs or lanes for data transfer and additional connector pins assigned for USB 2.0 support.

The USB-C cable can be used to transfer video data on the display device, such as for example, for full 4K resolution (3840×2160 lines or 4096×2160 lines) or future display device designs that use 5K resolution or DP1.3 standards. When the USB-C cable is used to transfer video data at the full 4K resolution, all four twisted pairs of the USB-C cable are used to transport video data. As a result, if the user desires to transfer non-video data, the slower USB 2.0 wires or pins can be used to transfer data. However, in some instances, the user may want to prioritize data transfer and use the faster USB 3.0 data transfer protocol used by the four twisted pairs of the USB-C cable. Currently, the configuration of the USB-C cable is set and the user cannot use the USB 3.0 data transfer speeds when the USB-C cable is connected to a 4K resolution monitor.

The examples of the present disclosure provide a method that allows the user to change the configuration of the data cable that can be used for video and non-video data connected to a display device. For example, the user may be provided an option to select one of a plurality of different configuration options for the display that may determine how the data cable transfers video data and non-video data. The different configurations may allow the user to use a lower resolution or refresh rate to free up some of the data lanes of the data cable. As a result, non-video data can be transferred at higher speeds associated with the data cable (e.g., USB 3.0 protocol rather than USB 2.0 protocol) simultaneously with the video data.

Figure 1:
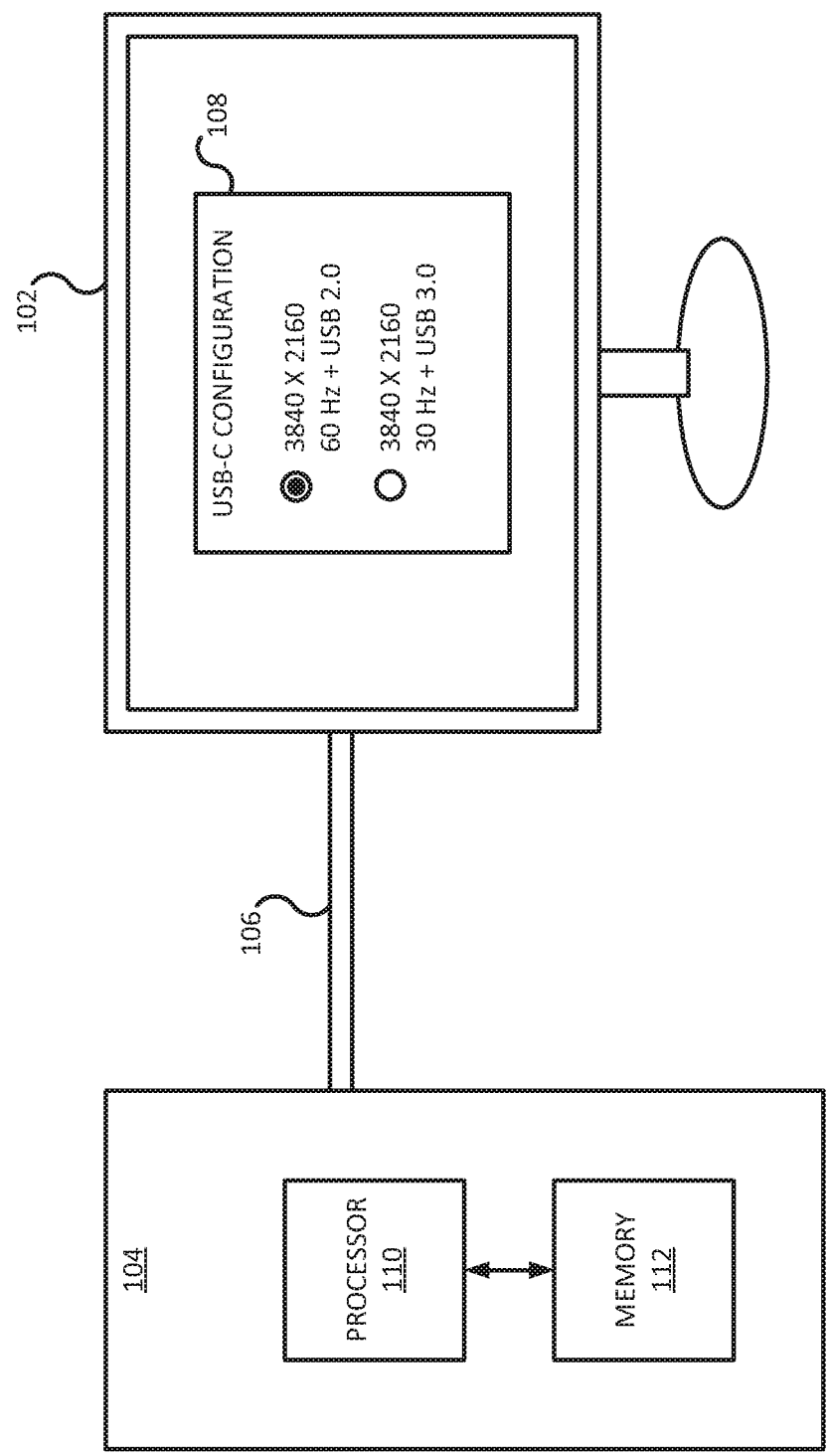
FIG. 1 is a block diagram of an example system of the present disclosure.

FIG. 1 illustrates a block diagram of an example system 100 of the present disclosure. The system 100 may include a display device 102 and a computing device 104. In one implementation, the display device 102 may be a computer monitor, television, and the like.

The computing device 104 may be a computer, video output device, and the like, such as a desktop computer, a laptop computer, a tablet computer, a cable box, a video game console, and the like. The computing device 104 may include a processor 110 and a memory 112. The memory 112 may be a non-transitory computer readable storage medium that stores instructions that are executed by the processor 110 to perform various functions or operations.

In one implementation, the display device 102 may have a full resolution of 3840×2160 lines (e.g., 4K resolution) and a full refresh rate of 60 hertz (Hz). The display device 102 may be connected to the computing device 104 via a data cable 106. The data cable 106 may be capable of transmitting video data and non-video data simultaneously. In one example, the data cable 106 may be a USB-C cable. However, it should be noted that any type of data or video cable that can connect the computing device 104 to the display device 102 and transfer video and non-video data simultaneously may be used. In one implementation, the display device 102 and the computing device 104 may have a USB-C interface to connect the data cable 106 and a USB-C controller to receive and transmit video data and non-video data over the USB-C cable.

As noted above, when the display device 102 operates at the full resolution and the full refresh rate all data lanes of the data cable 106 are used to transfer video data. For example, with a USB-C data cable all four twisted pairs may be used to transfer video data. Thus, none of the twisted pairs are available to transfer non-video data using the USB 3.0 data transfer protocol.

In one implementation, the display device 102 may provide a plurality of different configuration options to change the configuration of the data cable 106. In one example, a menu 108 that includes the plurality of different configuration options may be displayed. In one example, the menu 108 may be part of the on-screen display (OSD) of the display device 102. As a result, the menu 108 may appear even when the display device 102 is not connected to the computing device 104 or when the data cable 106 is configured to temporarily not send video data (as discussed in further detail below).

The plurality of different configuration options may include a full resolution and a full refresh rate, a lower resolution, a lower refresh rate, both a lower resolution and a lower refresh rate, or no video data. The configuration option that is selected may modify how the data cable 106 is configured for use. For example, at the full resolution and full refresh rate (e.g., 3840×2160 lines and 60 Hz) and when using a USB-C cable, all four twisted pairs may be used for video data and the USB 2.0 protocol may be available for non-video data transfer.

Another option may be to lower the refresh rate to 30 Hz (e.g., 3840×2160 lines and 30 Hz). At the lower refresh rate, two twisted pairs may be freed up to be used for non-video data transfer using the USB 3.0 protocol.

Some users may prefer a faster refresh rate, but a lower resolution for less flicker. Thus, another option may be to lower the resolution to 1920×1080 lines (e.g., full HD) and keep the 60 Hz refresh rate. At the lower resolution, two twisted pairs may also be freed up to be used for non-video data transfer using the USB 3.0 protocol.

In some instances, the user may want to use all four twisted pairs temporarily for non-video data transfer using the USB 3.0 protocol. As a result, one option may be to temporarily disable video data transfer and free up all data lanes of the data cable 106 for non-video data transfer using the USB 3.0 protocol (e.g., all four twisted pairs of a USB-C cable).

It should be noted that other configuration options not listed above can also be provided in the menu 108. The examples provided above or illustrated in the menu 108 in FIG. 1 should not be considered limiting.

Figure 2:
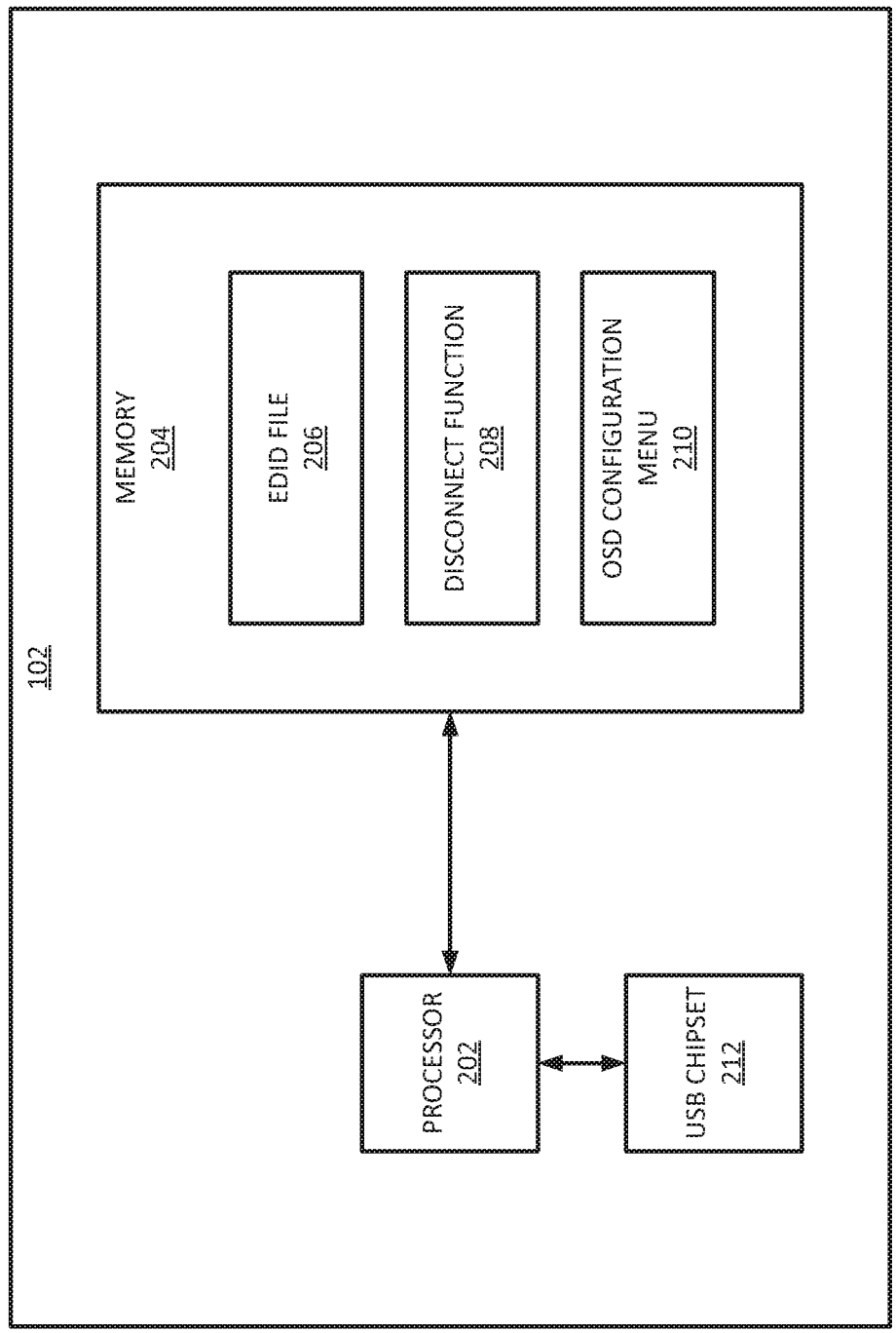
FIG. 2 is a functional block diagram of the example display device of the present disclosure.

FIG. 2 illustrates an example functional block diagram of the display device 102. In one example, the display device 102 may include a processor 202, a memory 204 and a universal serial bus (USB) chipset 212. The memory 204 may be a non-transitory computer readable storage medium that stores instructions that are executed by the processor 202 to perform various functions or operations.

The memory 204 may store an extended display identification data (EDID) file 206. The EDID file 206 may include information related to the specifications (e.g., maximum resolution and maximum refresh rate) of the display device 102. The EDID file 206 may be transferred to the computing device 104 upon initialization (e.g., powering up, initial connection, and the like) to determine what kind of video data can be transmitted and how the video data can be transmitted over the data cable 106.

In one implementation, the EDID file 206 may be modified by the processor 202 based on the configuration option that is selected. For example, if the user chooses to reduce the refresh rate, the processor 202 may edit the EDID file 206 to have a maximum refresh rate of 30 Hz instead of 60 Hz. Thus, when the computing device 104 receives the modified EDID file 206, the user may be provided an option to set the display device 102 to 30 Hz. In other words, the computing device 104 may be "tricked" into believing that the display device 102 has a maximum refresh rate capability of 30 Hz rather than 60 Hz. Said another way, after the computing device 104 receives the modified EDID file 206, the computing device 104 may believe that it is connected to a "new" display device that has a maximum refresh rate capability of 30 Hz rather than 60 Hz.

Once the display device 102 is set to display at a refresh rate of 30 Hz, the video data may be transmitted by the computing device 104 for a refresh rate of 30 Hz that uses two twisted pairs (rather than the full four twisted pairs used by the full resolution and full refresh rate of 60 Hz). Consequently, some data lanes of the data cable 106 may be freed up for non-video data transfer using the USB 3.0 protocol (e.g., two twisted pairs in a USB-C cable). In other words, video data and non-video data using USB 3.0 protocol can be transferred simultaneously when the data cable 106 is a USB-C cable.

The disconnection function 208 may include instructions for the display device 102 to simulate a disconnect procedure. As a result, the computing device 104 may believe that a new display device 102 is being connected to the computing device 104. The disconnect procedure allows the display device 102 to transmit the modified EDID file 206 to the computing device 104. In one implementation, the disconnect function 208 may be initiated by the processor 202 each time the EDID file is modified due to a new selection of a configuration option.

The OSD configuration menu 210 may store the user interface and display presented to the user. For example, the OSD configuration menu 210 may include the instructions and the plurality of configuration options that are displayed to the user via the menu 108. The OSD configuration menu 210 does not use video data sent from the computing device 104. In other words, the OSD configuration menu 210 may generate the menu 108 independent of the computing device 104.

In one implementation, the computing device 104 may detect that no data is being transferred using the USB 3.0 protocol. As a result, after a pre-determined amount of time as expired (e.g., 60 seconds, 5 minutes, 30 minutes, and the like) since detecting data has been transferred via the USB 3.0 protocol, the computing device 104 may send a notification to the display device 102. In one example, the amount of time may be based on an estimated amount of time to complete the data transfer that is using the USB 3.0 protocol.

The display device 102 may display a message to the user, in response to the notification. The message may indicate that it appears the user has completed the non-video data transfer and ask the user if he or she would like to return the display device 102 to the full resolution and the full refresh rate (e.g., 3840×2160 lines and 60 Hz). If the user confirms the option to return the display device 102 to the full resolution and the full refresh rate, the processor 202 may edit the EDID file 206, perform the disconnect function 208 and change the configuration of the data cable 106, as described above.

In one implementation, the display device 102 may automatically change the EDID file 206 to operate at a full resolution and a full refresh rate after the user has changed the configuration to a lower resolution and/or a lower refresh rate. For example, using the example above, if the pre-determined amount of time has expired since detecting data has been transferred via the USB 3.0 protocol, the processor 202 may automatically change the EDID file 206, perform the disconnect function 208 and change the configuration of the data cable 106, as described above.

The USB chipset 212 may be responsible for communicating supported configurations of the display device 102. In one example, the USB chipset 212 may report a reduced number of supported configurations. For example, if the display device 102 has four supported configurations with the full resolution of 3840×2160 and the full refresh rate of 60 Hz, the USB chipset 212 may report three supported configurations that does not include the full resolution of 3840×2160 and/or the full refresh rate of 60 Hz. The USB chipset 212 may communicate the reduced number of supported configurations to the computing device 104.

Figure 3:
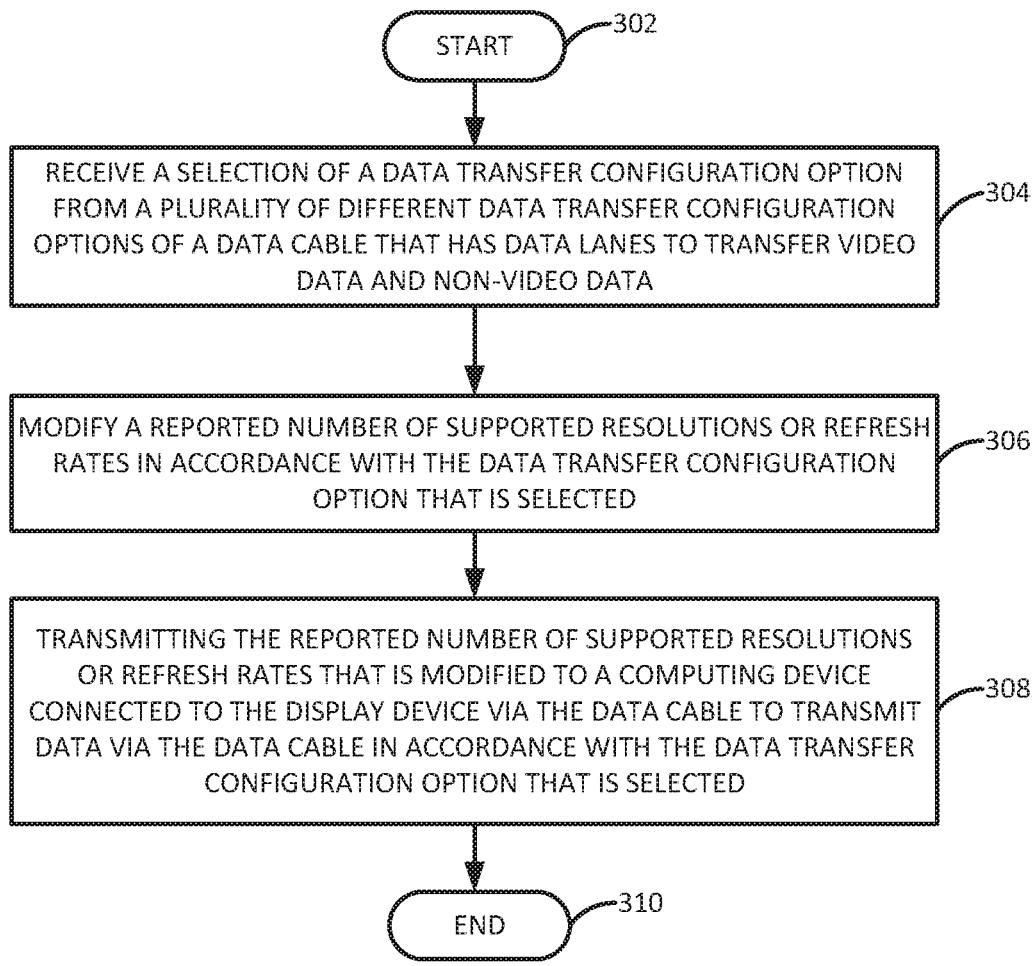
FIG. 3 is a block diagram of an example method for changing a data cable configuration.

FIG. 3 illustrates a flow diagram of an example method 300 for changing a data cable configuration. In one example, the method 300 may be performed by the processor 202 of the display device 102 illustrated in FIG. 2.

At block 302, the method 300 begins. At block 304, the method 300 receives a selection of a data transfer configuration option from a plurality of different data transfer configuration options of a data cable that has data lanes to transfer video data and non-video data. For example, the data cable may be a USB-C cable and the OSD may display a menu that provides the plurality of different USB-C configuration options. The USB-C cable may have data lanes (e.g., four twisted pairs) that can be used to transfer video data and non-video data. The different USB-C configuration options may include options to lower or reduce the resolution, the refresh rate, both the resolution and the refresh rate, or temporarily stop the transmission of video data.

The configuration options may change the configuration of the USB-C cable and how data is transferred over the USB-C cable. For example, changing the configuration may free up some of the data lanes (e.g., twisted pairs of the USB-C cable) to transmit both video data and non-video data simultaneously using the USB 3.0 data transfer protocol. In contrast, when the display device operates at a full resolution and a full refresh rate (e.g., 3840×2160 lines and 60 Hz) all data lanes (e.g., all four twisted pairs of the USB-C cable) are used to transmit video data. As a result, non-video data is transferred using the USB 2.0 data transfer protocol that is slower than the USB 3.0 data transfer protocol.

At block 306, the method 300 modifies a reported number of supported resolutions or refresh rates in accordance with the data transfer configuration option that is selected. The reported number of supported resolutions or refresh rates may be modified to "trick" the computing device into believing that the maximum resolution and/or maximum refresh rate is lower than the actual maximum resolution and the actual maximum refresh rate. The reported number of supported resolutions or refresh rates may be modified in a number of different ways.

In one implementation, the EDID file stored in a display device may be modified. The EDID file provides information to the computing device regarding the display capabilities of the display device. As a result, the EDID file is modified in accordance with the data transfer configuration option that is selected.

In another implementation, the supported resolutions may be stored in a chipset (e.g., a USB chipset) of a display device. Based on a selection, the chipset may report a reduced number of supported resolutions and/or refresh rates to the computing device.

At block 308, the method 300 transmits the reported number of supported resolutions or refresh rates that is modified to a computing device connected to a display device via a data cable to transmit data via the data cable in accordance with the data transfer configuration option that is selected. In one example, the display device may initiate a disconnect function. The disconnection function allows the computing device to perform an initialization process believing that a new display device is being connected and request the EDID file from the display device. In another example, the chipset of the display device may report the reduced number of supported resolutions and/or refresh rates in response to receiving a selection via an OSD menu of the display device.

At a later time, the user may change the configuration back, or the configuration may be changed automatically, to allow the display device to display at full resolution and a full refresh rate. For example, the blocks 304-308 may be repeated.

The method 300 may be performed while the computing device is turned on or turned off. As noted above, the menu that displays the plurality of different data transfer configuration options is part of the display device's on-screen display. As a result, the menu may be displayed independently of the computing device. At block 310, the method 300 ends.

Figure 4:
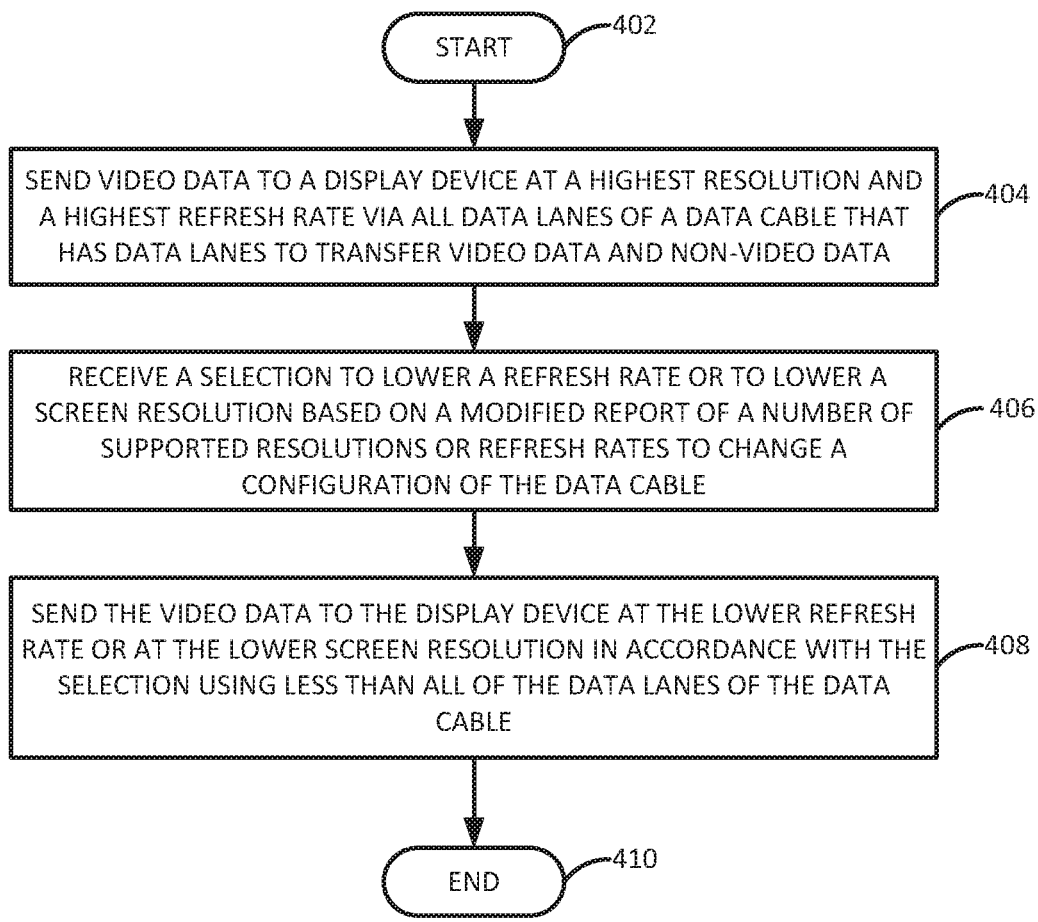
FIG. 4 is a block diagram of another example method for changing a data cable configuration.

FIG. 4 illustrates a flow diagram of an example method 400 for changing a data cable configuration. In one example, the method 400 may be performed by the processor 110 of the computing device 104 illustrated in FIG. 1.

At block 402, the method 400 begins. At block 404, the method 400 sends video data to a display device at a highest resolution and a highest refresh rate via all data lanes of a data cable that has data lanes to transfer video data and non-video data. For example, the display device may be a 4K resolution monitor that operates at a highest resolution of 3840×2160 lines and at a highest refresh rate of 60 Hz. The data cable may be a USB-C cable that has four twisted pairs. All four twisted pairs may be used initially to transfer video data at the highest resolution and the highest refresh rate.

At block 406, the method 400 receives a selection to lower a refresh rate or to lower a screen resolution based on a modified report of a number of supported resolutions or refresh rates to change a configuration of the data cable. For example, at a later time a user may desire to transfer non-video data using the USB 3.0 protocol over the data cable. The user may select a new configuration via an OSD of the display device.

In response to the selection, the display device may modify the reported number of monitor resolutions or refresh rates. For example, the display device may modify the EDID file stored in the display device. The display device may perform a disconnect function and the EDID file may be transmitted to the computing device. In another example, the chipset (e.g., a USB chipset) may report a reduced number of supported resolutions and/or refresh rates to the computing device in response to the selection.

The computing device may provide configuration options in accordance with the modified report of a number of supported resolutions or refresh rates. For example, even though the display device is capable of displaying at a highest resolution of 3840×2160 lines and at a highest refresh rate of 60 Hz, the computing device may not provide this setting to the user. Rather, the user may have selected a configuration to lower the resolution to 1920×1080 lines at a refresh rate of 60 Hz. As a result, based on the modified report of a number of supported resolutions or refresh rates, the computing device may allow the user to set the display device to a maximum resolution of 1920×1080 lines (as opposed to the actual maximum resolution capability of 3840×2160) and a refresh rate of 60 Hz.

At block 408, the method 400 sends the video data to the display device at the lower refresh rate or at the lower screen resolution in accordance with the selection using less than all of the data lanes of the data cable. For example, the lower resolution caused by the change in the configuration that is selected by the user may use two data lanes of the data cable. In one example, when a USB-C cable is used, two of the four twisted pairs of the USB-C cable may now be free for non-video data transfer using the USB 3.0 protocol. Thus, the computing device may send video data and non-video data using the USB 3.0 protocol simultaneously over the same USB-C cable. At block 410, the method 400 ends.

Figure 5:
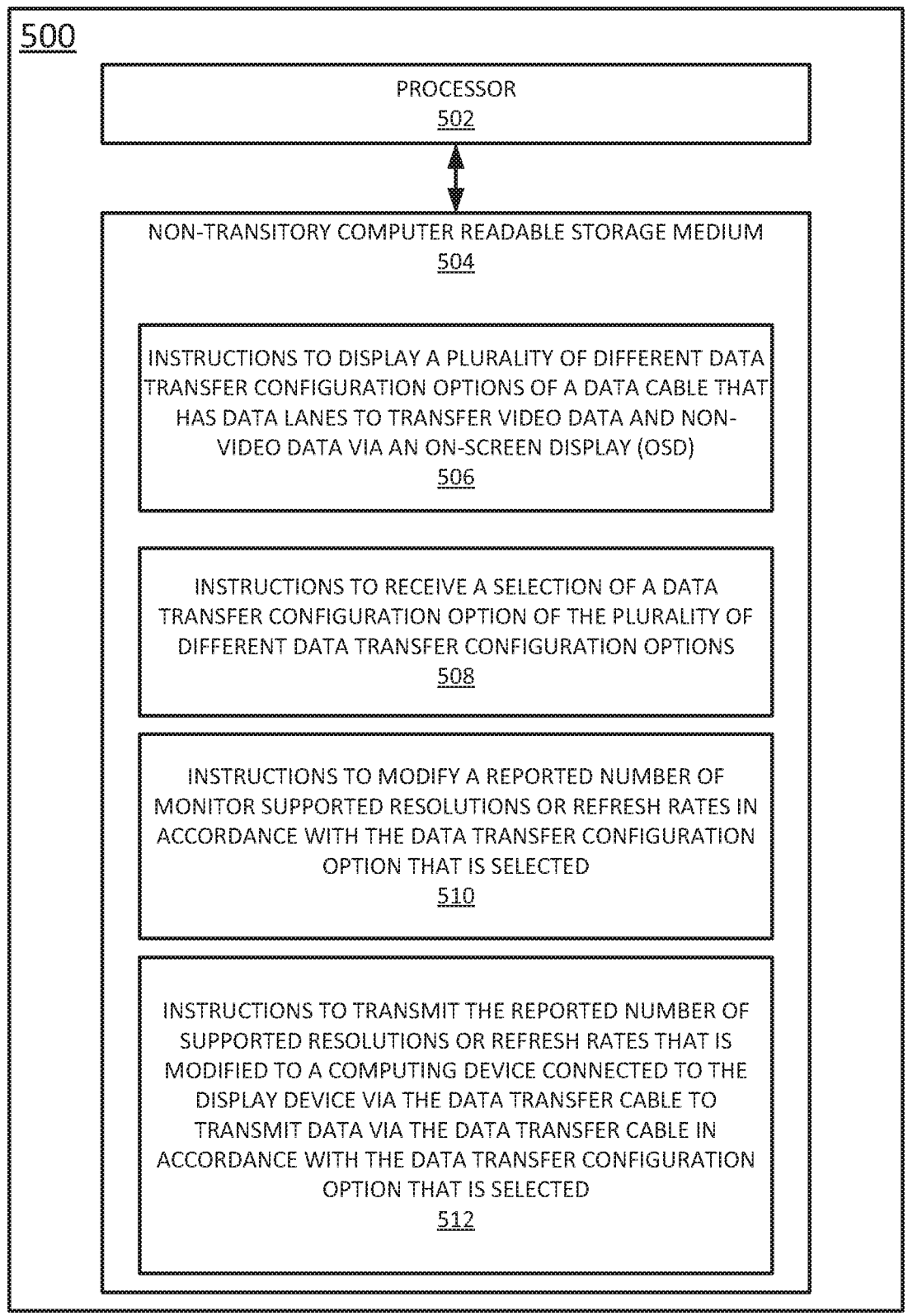
FIG. 5 is a block diagram of an example non-transitory computer readable medium storing instructions executed by a processor.

FIG. 5 illustrates an example of an apparatus 500. In one example, the apparatus may be the display device 102. In one example, the apparatus 500 may include a processor 502 and a non-transitory computer readable storage medium 504. The non-transitory computer readable storage medium 504 may include instructions 506, 508, 510 and 512 that when executed by the processor 502, cause the processor 502 to perform various functions.

In one example, the instructions 506 may include instructions to display a plurality of different data transfer configuration options of a data cable that has data lanes to transfer video data and non-video data via an on-screen display (OSD). For example, the data cable may be a USB-C cable and the data transfer configuration options may be different USB-C configuration options. The instructions 508 may include instructions to receive a selection of a data transfer configuration option of the plurality of different data transfer configuration options. The instructions 510 may include instructions to modify a reported number of supported resolutions or refresh rates in accordance with the data transfer configuration option that is selected. The instructions 512 may include instructions to transmit the reported number of supported resolutions or refresh rates that is modified to a computing device connected to the display device via the data cable to transmit data via the data cable in accordance with the data transfer configuration option that is selected.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
 receiving a selection of a data transfer configuration option from a plurality of different data transfer configuration options of a data cable that has data lanes to transfer video data and non-video data, wherein the selection is made on an on-screen display menu of a display device, wherein the on-screen display menu is to display different selectable configuration options for the display device that are associated with different data transfer configuration options of the data cable;
 modifying a reported number of supported resolutions or refresh rates in accordance with the data transfer configuration option that is selected; and
 transmitting the reported number of supported resolutions or refresh rates that is modified to a computing device connected to the display device via the data cable to transmit data via the data cable in accordance with the data transfer configuration option that is selected.

2. The method of claim 1, wherein the modifying comprises modifying an extended display identification data (EDID) file stored in a display device.

3. The method of claim 2, wherein the transmitting comprises:
 executing a disconnect function to transmit the EDID file to the computing device.

4. The method of claim 1, wherein the modifying comprises reducing the reported number of supported resolutions or refresh rates in a chipset of the display device.

5. The method of claim 1, wherein the modifying comprises reducing a refresh rate of the display device to allow two data lanes of the data cable to be used for Universal Serial Bus 3.0 data transfer.

6. The method of claim 1, wherein the modifying comprises reducing a screen resolution of the display device to allow two data lanes of the data cable to be used for Universal Serial Bus 3.0 data transfer.

7. The method of claim 1, wherein the display device has a default configuration that dedicates all data lanes of the data cable to video data to display at the highest resolution.

8. A method, comprising:
 sending video data to a display device at a highest resolution and a highest refresh rate via all data lanes of a data cable that has data lanes to transfer video data and non-video data;
 receiving a selection to lower a refresh rate or to lower a screen resolution based on a modified report of a number of supported resolutions or refresh rates to change a configuration of the data cable, wherein the selection is made on an on-screen display menu of the display device, wherein the on-screen display menu is to display different selectable configuration options for the display device that are associated with different data transfer configuration options of the data cable; and
 sending the video data to the display device at the lower refresh rate or at the lower screen resolution in accordance with the selection using less than all of the data lanes of the data cable.

9. The method of claim 8, wherein the modified report comprises an updated extended display identification data (EDID) file that is received from the display device that is modified.

10. The method of claim 9, wherein the updated EDID file is received via a disconnect function executed by the display device.

11. The method of claim 8, wherein the modified report comprises a report from the display device that reduces the reported number of supported resolutions or refresh rates in a chipset of the display device.

12. The method of claim 8, wherein the configuration of the data cable is changed to use two data lanes of the data cable for the video data and two data lanes of the data cable for non-video data transfer using a Universal Serial Bus 3.0 protocol to transmit the non-video data over the data cable simultaneously with the video data.

13. The method of claim 8, wherein the modified report removes the highest resolution and the highest refresh rate as a configuration option for the display device.

14. A non-transitory computer readable storage medium encoded with instructions executable by a processor of, the non-transitory computer-readable storage medium comprising:
 instructions to display different selectable configuration options for a display device that are associated with a plurality of different data transfer configuration options of a data cable that has data lanes to transfer video data and non-video data via an on-screen display (OSD) menu of the display device;
 instructions to receive a selection of a configuration option associated with a data transfer configuration option of the plurality of different data transfer configuration options from the OSD menu of the display device;
 instructions to modify a reported number of supported resolutions or refresh rates in accordance with the data transfer configuration option that is selected; and
 instructions to transmit the reported number of supported resolutions or refresh rates that is modified to a computing device connected to the display device via the data cable to transmit data via the data cable in accordance with the configuration option that is selected.

15. The non-transitory computer readable storage medium of claim 14, wherein the instructions to modify the reported number of supported resolutions or refresh rates comprises: instructions to modify an extended display identification data (EDID) file stored in the display device; or instructions to reduce the reported number of supported resolutions or refresh rates in a chipset of the display device.

* * * * *